Patented Nov. 18, 1952

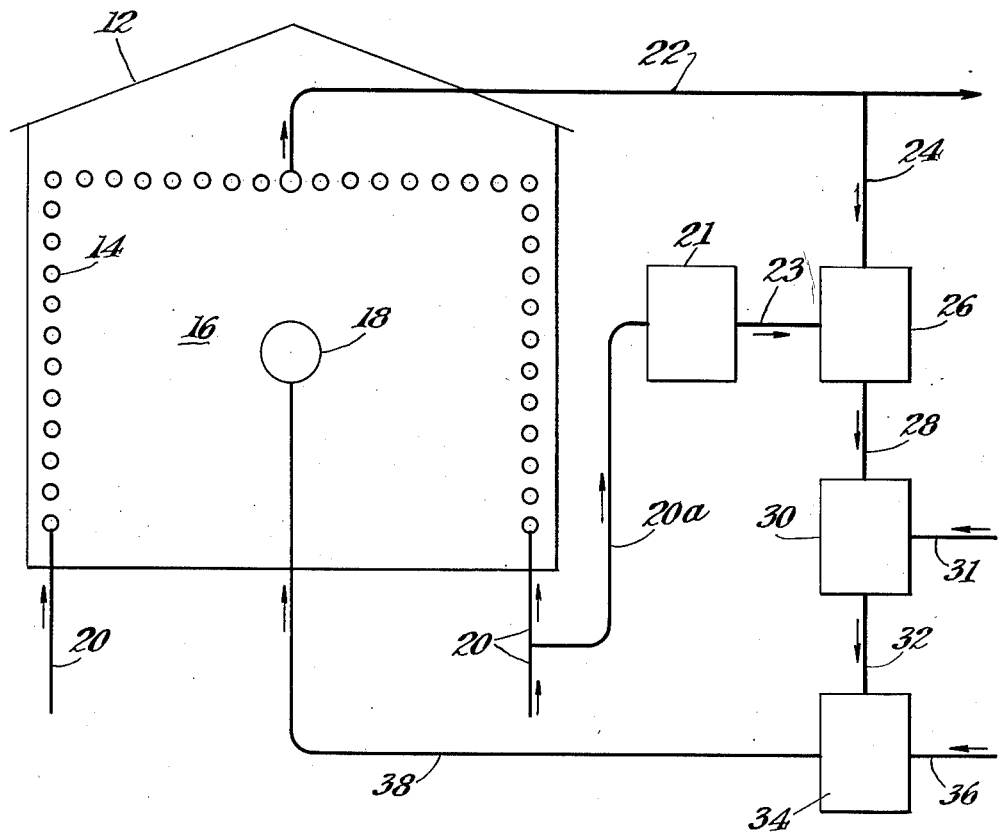

2,618,668

UNITED STATES PATENT OFFICE 2,618,668

HEATER CONTROL

Ward J. F. O'Connor and Frank A. Rowen, Jr., Bayonne, N. J., assignors to The Lummus Company, New York, N. Y., a corporation of Delaware Application July 14, 1949, Serial No. 104,726

2 Claims. (Cl. 260—683)

This invention relates to the pyrolytic conversion of gaseous hydrocarbons in which the hydrocarbon charge is passed through the conversion apparatus in an attenuated stream, under conditions of temperature and pressure suitable for cracking. More particularly, this invention is concerned with automatic control of cracking in refinery heaters, whereby a continuous automatic correlation is maintained between the composition of the product gases and the rate of flow of fuel to the burners.

It has long been recognized, that for efficient and economical operation of refinery heaters, it is essential that the combustion of fuel be accurately controlled so as to maintain a desired rate of heat input to the heating surfaces. Where the charge to a heater is received at constant temperature and is of constant composition, it is desired to maintain a constant rate of heat input. However, where the charge varies considerably due to external operating conditions and where it is necessary to maintain constant composition of the products, it is desirable to establish a correlation between the product characteristics and the rate of flow of fuel to the heater. The cracking rate must be adjusted to allow constant cracking over a range of variation of composition and quantity of the charge stock.

While the existence of the problem of control of heater effluent is generally recognized, there has not been found a simple, accurate, and sensitive means of controlling a heater operating to produce a gaseous product under severe temperature and pressure conditions.

Generally, it is customary to control a heater by maintaining a constant outlet temperature. As this temperature changes, the heat rate is adjusted to bring it back to the desired point.

In the production of ethylene at a constant high rate by the cracking of ethane, propane, or mixtures of propane and propylene, it is not desirable to use the effluent temperature as a variable on which to base control. Due to changes in the composition and quantity of the feed to the heater which result from external operating conditions, it is necessary to vary the cracking rate slightly to compensate therefor and to obtain a constant rate of ethylene production. This means that the outlet temperature varies for changes in feed. Hydrogen and methane are always produced when ethylene is made by cracking. Since certain other properties of a hydrocarbon mixture containing these two components reflect changes in the composition of the mixture to a greater extent than does either the temperature or the pressure, it is desirable to utilize the former as a basis for control of the process.

We have found that the measurement of the thermal conductivity or the density of the effluent gas is a satisfactory means of determining cracking rates. Either of these factors varies over an appreciable range for slight changes in composition of the product in pyrolytic reactions of the above-mentioned type.

In the pyrolysis of ethane, propane, or mixtures of propane and propylene, the thermal conductivity of the resulting effluent gas from the heater is greatly affected by the percentage of hydrogen and methane contained therein. This is because the thermal conductivity of hydrogen is approximately twelve times as great, and that of methane is approximately twice as great as that of other lower hydrocarbons.

The following table shows the absolute values of the thermal conductivities of hydrogen and the several lower hydrocarbons as well as the thermal conductivities referred to propane.

Thermal conductivity

[$K$(B. t. u./hr./sq. ft./°F./ft. @ 32° F.).]

| Gas | $k$ | $k$ referred to propane |
|---|---|---|
| Hydrogen | 0.100 | 11.50 |
| Methane | 0.0175 | 2.01 |
| Ethane | 0.0106 | 1.22 |
| Ethylene | 0.0101 | 1.15 |
| Propane | 0.0087 | 1.00 |
| Butane (n) | 0.0078 | 0.90 |
| Pentane (n) | 0.0074 | 0.85 |
| Hexane (n) | 0.0072 | 0.83 |

In the pyrolytic reaction of hydrocarbons, conditions are maintained such that very little, if any, hydrocarbons are formed which are heavier than the charge stock. The products of cracking include unconverted feed, the desired product-ethylene, substantial amounts of hydrogen and methane, and lesser amounts of other hydrocarbons. The thermal conductivity of this mixture is of course a function of that of each component and the relative amounts thereof. Due to the comparatively large values of the thermal conductivity of hydrogen and methane, and the fact that for all the other components, this constant is substantially the same, it is easily seen that small amounts of these products may be readily detected in the effluent gas. Thus a small change in composition is greatly magnified to a point where it may be used as a basis for control.

The principal object of this invention is to provide a simple, sensitive, automatic, accurate, and inexpensive method of controlling a heater operating under cracking conditions.

A second object of this invention is to obtain a continuous and accurate analysis of the gaseous reaction products from a heater.

A third object of this invention is to control conditions in a heater cracking a hydrocarbon charge to produce a constant high yield of ethylene.

Further objects and advantages of our invention will appear from the following description of a preferred form of embodiment taken in connection with the attached drawing illustrative thereof.

The figure shows a fluid heater 12 with which this invention is adapted to be used. Suitable for this purpose is a heater such as shown in U. S. Patents 2,456,786 and 2,456,787 to L. Kniel, or Reissue 21,396 to C. S. Reed et al. Heater 12 has tubes 14 suitably disposed in a fired chamber 16. One or more burners 18 are located in the furnace as shown.

Charge stock, either liquid or gas, is fed into heater 12 through lines 20. A sample passes through line 20a to a thermo-conductivity reference cell 21 wherein it generates a standard signal corresponding to the composition of the charge stock. This standard signal is transmitted through signal line 23 hereinafter referred to. After passing through tubes 14, the gaseous effluent leaves the heater through pipe 22.

A sample of effluent gas is bled from pipe 22 through pipe 24 into thermo-conductivity unit 26. At this point the thermal conductivity of the effluent gas is measured. It has been found desirable to pass a sample of feed from line 20 through line 20a to the reference cell 21 for the thermoconductivity cell 26 as above described. It is also found that a satisfactory reference signal may be produced if a sample of substantially pure propane is passed into the reference cell. Both of these methods produce a standard signal which is of the same order of magnitude as the product signal. When using other standards such as nitrogen, whose thermal conductivity differs appreciably from that of the heater effluent, additional electric circuits may be inserted to bring the readings to a proper level on a thermoconductivity scale. If desired, the standard signal may be introduced into the control circuit through controller 30 rather than through meter 26 as herein described. A signal transmitting line 23 connects reference cell 21 to meter 26.

A signal is generated in unit 26 corresponding to the value of the thermal conductivity of said gas or changes in the value from a set value.

It is convenient to read this signal as percent of hydrogen in the effluent. When treating propane and mixtures of propane and propylene, it is found that this value is below fifteen percent. When treating ethane, this value is below twenty percent.

This signal is transmitted through line 28 to controller 30 at which point it actuates the second, controlling signal. This control signal may be introduced into the control system through line 31. The magnitude and direction of the signal admitted from line 31 to controller 30 corresponds to the magnitude and the direction of the signal received through line 28. This controlling signal is transmitted to fluid control valve assembly 34. Depending upon the magnitude and direction of the signal received at 34, the valve will permit more or less fuel to pass from line 36 through fluid control means 34 and line 38 to burner 18. Thus, the heat rate will be automatically adjusted by controlling the fuel flow to burner 18. Fluid control means 34 will normally be a pressure control valve when the fuel is a gas and a flow control valve when the fuel is a liquid.

In one embodiment of this invention operated to produce ethylene, a charge stock consisting mainly of propane is fed into heater 12 through lines 20 into tubes 14 and leaves the heater at 22. Flow of fuel to the burner 18 is adjusted so that the outlet temperature of the stock is about 1400° F. This high temperature produces pyrolytic conversion of approximately 45% of the propane and propylene charged to the furnace in one case. The thermoconductivity meter 26 may be graduated to show directly the percent of hydrogen in the effluent.

As the composition or quality of the charge to the furnace changes, the percent of propane cracked varies accordingly. The conductivity of the effluent changes, increasing as more hydrogen, methane, ethane, and ethylene are produced. This will be noted by thermoconductivity unit 26 which initiates the proper signal to be sent through line 28 to controller 30. This signal, which may be electrical, produces a response in controller 30. A control signal is generated therein which may be electric, pneumatic, hydraulic, or of any other recognized medium. An external reservoir, not shown, may be maintained to feed a high pressure fluid through line 31 into control signal generator 30 and then to line 32 and heater fuel supply controller 34. Here the fuel supply is adjusted to increase or decrease the rate of flow of fuel to burner 18 and the corresponding rate of pyrolytic conversion in tubes 14.

This simple, efficient, and economical system is designed to operate from the outlet side of heaters which crack or pyrolytically treat ethane, propane, or mixtures of propane and propylene forming products consisting in part of hydrogen and methane. These heaters are normally operated in such a manner as to produce as large a quantity of ethylene as is possible.

Instruments designated by numerals 21, 26, 30 and 34 are standard and well known to those skilled in the art.

Reference cell 21, for example, may be an appropriately sized chamber inserted into which are two electric leads of a type suitable for measuring thermal conductivity. This cell is adapted to measure the thermal conductivity of a constant or base stream.

Thermoconductivity unit 26 may comprise, for instance, a Wheatstone bridge arrangement, including a conductivity cell to measure the thermal conductivity of the effluent in lines 22 and 24, several adjustable or fixed resistors and capacitors, and a voltmeter.

Controller 30 operatively connected to 26 through line 28 may include a solenoid operated valve capable of admitting air through line 31 to line 32.

Fluid control valve assembly 34 could suitably be an air operated slide valve.

We claim:

1. The process of cracking a saturated normally gaseous hydrocarbon to produce predominant yields of unsaturated hydrocarbons and hydrogen which comprises passing said hydrocarbon charge through an attentuated path, subjecting said hydrocarbons to cracking conditions of the order of 1400° F., passing a portion of the cracked effluent through a thermoconductivity measuring device, measuring the thermoconductivity of the hydrogen, simultaneously measuring the thermoconductivity of the hydrocarbon charge and varying the temperature in accordance with variations of the net thermoconductivity with respect to a predetermined initial thermoconductivity setting.

2. The process of cracking a hydrocarbon as claimed in claim 1, in which the hydrocarbon is propane and the conversion is of predominant yields of ethylene.

WARD J. F. O'CONNOR.
FRANK A. ROWEN, Jr.

REFERENCES CITED

The following references are of record in the file of this patent:

UNITED STATES PATENTS

| Number | Name | Date |
|---|---|---|
| 1,777,894 | Porter | Oct. 7, 1930 |
| 2,014,724 | Eastman | Sept. 17, 1935 |
| 2,061,598 | Smith et al. | Nov. 24, 1936 |
| 2,345,272 | Luhrs | Mar. 28, 1944 |